United States Patent [19]
Eilert et al.

[11] Patent Number: 5,537,542
[45] Date of Patent: Jul. 16, 1996

[54] APPARATUS AND METHOD FOR MANAGING A SERVER WORKLOAD ACCORDING TO CLIENT PERFORMANCE GOALS IN A CLIENT/SERVER DATA PROCESSING SYSTEM

[75] Inventors: Catherine K. Eilert, Wappingers Falls; Bernard R. Pierce, Poughkeepsie, both of N.Y.

[73] Assignee: International Business Machines Corporation, Armonk, N.Y.

[21] Appl. No.: 222,752

[22] Filed: Apr. 4, 1994

[51] Int. Cl.$^6$ .................................................. G06F 11/34
[52] U.S. Cl. ............................ 395/184.01; 364/264.4; 364/285; 364/264.5; 364/DIG. 1; 395/200.01
[58] Field of Search ............................ 395/800, 184.01, 395/200.01

[56] References Cited

U.S. PATENT DOCUMENTS

| | | | |
|---|---|---|---|
| 4,481,583 | 11/1984 | Mueller | 364/300 |
| 4,633,387 | 12/1986 | Hartung et al. | 364/200 |
| 4,727,487 | 2/1988 | Masui et al. | 364/300 |
| 4,736,318 | 4/1988 | Delyani et al. | 364/200 |
| 5,050,070 | 9/1991 | Chastain et al. | 364/200 |
| 5,155,858 | 10/1992 | DeBruler | 395/800 |
| 5,187,790 | 2/1993 | East et al. | 395/725 |
| 5,193,189 | 3/1993 | Flood et al. | 395/650 |
| 5,212,793 | 5/1993 | Donica et al. | 395/700 |
| 5,230,065 | 7/1993 | Curley et al. | 395/200 |
| 5,241,677 | 8/1993 | Naganuma et al. | 395/650 |
| 5,303,166 | 4/1994 | Amalfitano | 395/500 |
| 5,339,430 | 8/1994 | Lundin | 395/700 |
| 5,442,730 | 8/1995 | Bigus | 395/650 |

OTHER PUBLICATIONS

IEEE Transactions on Software Engineering, vol. SE–12 No. 10, Oct. 1986 "On Multisystem Coupling Through Function Request Shipping" by D. W. Cornell, et al. pp. 1006–1017.

IEEE Transactions on Software Engineering, vol. SE–12 #5 May 1986–"Adaptive Load Sharing in Homogeneous Distributed Systems" by D. L. Eager, et al. pp. 662–675.

"PAM–A Noniterative Approximate Solution Method for Closed Multichain Querering Networks" by C. T. Hsieh, et al pp. 119–183, 1989.

IEEE Transactions on Computers, vol. C–34, #3, Mar. 1985"Load Sharing in Distributed Systems" by G. T. Wang, et al. pp. 204–217.

Journal of the Association for Computing Machinery vol. 32, No. 2, Apr. 1985, "Optimal Static Load Balancing in Distributed Computer Systems" by A. Tantawi, et al. pp. 445–465.

Machframe Journal Jul. 1989—"The Three Phases of Service Levels" by C. Watson, pp. 42–43 & 82.

IEEE Software Engineering vol. 14, No. 9, Sep. 1988 "Dynamic Transaction Routing in Distributed database Systems" by P. Yu, et al., pp. 1307–1318.

(List continued on next page.)

Primary Examiner—Eric Coleman
Attorney, Agent, or Firm—Lawrence D. Cutter; William B. Porter; Jeff Rothenberg

[57] ABSTRACT

A workload manager creates an in storage representation of a set of performance goals, each goal associated with a class of clients (e.g., client transactions) in a client/server data processing system. A set of servers, providing service to the clients, are managed to bring the clients into conformity with the class performance goals by: calculating performance indexes for each class to determine the target class(es) which are farthest behind their class performance goals; analyzing the relationship among servers and client classes to determine which servers serve which classes; determining which resource(s) are impacting the service provided to the key servers (that is, those on which the target class(es) are most heavily reliant), and projecting the effect of making more of these resources available to those servers; and, finally, making the changes to those resources which are projected to most favorably indirectly affect the performance of the target class(es).

16 Claims, 14 Drawing Sheets

OTHER PUBLICATIONS

Proc. of 6th Int. Conf. on DCS, 1986 "On Coupling Partitioned Database Systems" by P. Yu, et al., pp. 148–157.

IBM Research Report (RC 15967) "Optimality & Finite Time Behavior of an Adaptive Multi-objective Scheduling Algorithm" by P. Bhattacherya, et al., pp. 1–49, Jul. 30, 1990.

IBM Patent Application Y09–92–020, serial #07/876,670 filed Apr. 30, 1992.

SERVER PERFORMANCE BLOCK
151

SERVER HISTORY BLOCK
152

DATA FOR FIND BOTTLENECK

| 701 | APPOR CPU DELAY SAMPS | | | APPOR AUX PAGING DELAY SAMPS | ... |
|---|---|---|---|---|---|
| 702 | SVR S1 | | | SVR S1 | SVR S1 |
| 703 | FLAG | | | FLAG | ... |
| | | | | | |
| | APPOR CPU DELAY SAMPS | | | APPOR AUX PAGING DELAY SAMPS | ... |
| | SVR SN | | | SVR SN | SVR SN |
| | FLAG | | | FLAG | ... |
| | 704 | | 704 | | 704 |

WORK UNIT PAGING GRAPH 5,537,542

APPARATUS AND METHOD FOR MANAGING A SERVER WORKLOAD ACCORDING TO CLIENT PERFORMANCE GOALS IN A CLIENT/SERVER DATA PROCESSING SYSTEM

BACKGROUND OF THE INVENTION

The concept of allocating computer system resources to achieve user performance goals is known. For example, U.S. patent application Ser. No. 07/876670, now U.S. Pat. No. 5,504,894 "WORKLOAD MANAGER FOR ACHIEVING TRANSACTION CLASS RESPONSE TIME GOALS IN A MULTIPROCESSING SYSTEM", by D Ferguson et al, filed Apr. 30, 1992 and assigned to the assignee of the present invention, shows a process for calculating performance indexes, selecting goal classes whose performance is to be improved and reallocating resources to equitably improve performance. A problem arises in a client/server environment, in which clients (for example, client transactions) are served by one or more servers and one server typically may concurrently be serving more than one client—where the servers are managed by the operating system separately from the clients. The problem is one of managing the servers to accommodate goals (for example, response time goals) set for the client. While it is possible to envision goals being set for the server, the servers are typically not "visible" to the end users of the system who interact with the system through client transactions, so that associating goals only with the clients is more in keeping with the objective of making goals user-oriented.

In the present invention, performance management to meet goals is extended to the client/server environment where clients having different goals may be served by the same or different servers.

SUMMARY OF THE INVENTION

The present invention allows specification of a performance goal for clients in a client/server data processing system environment and manages the performance of the servers to best meet the performance goals of the clients. Each client may have a different performance goal. Each client may be served by a plurality of servers. Each server may serve a plurality of different clients, and each of the clients served by such a server may have different performance goals.

The importance of achieving a performance goal may also be specified with each performance goal and the servers may serve clients that each have goals with different importances.

Given an awareness of the client performance goals, the operating system takes on responsibility for allocation of system resources to servers of the clients such that the client goals are best achieved. Tradeoffs are made to best utilize the available capacity, based on actual achievement toward goals and the types of resources required to achieve those goals.

BRIEF DESCRIPTION OF THE DRAWINGS

The detailed description explains the preferred embodiments of the present invention, together with advantages and features, by way of example with reference to the following drawings

FIG. 1 is an illustrative work unit paging graph.

DETAILED DESCRIPTION OF THE INVENTION

Figure 1:
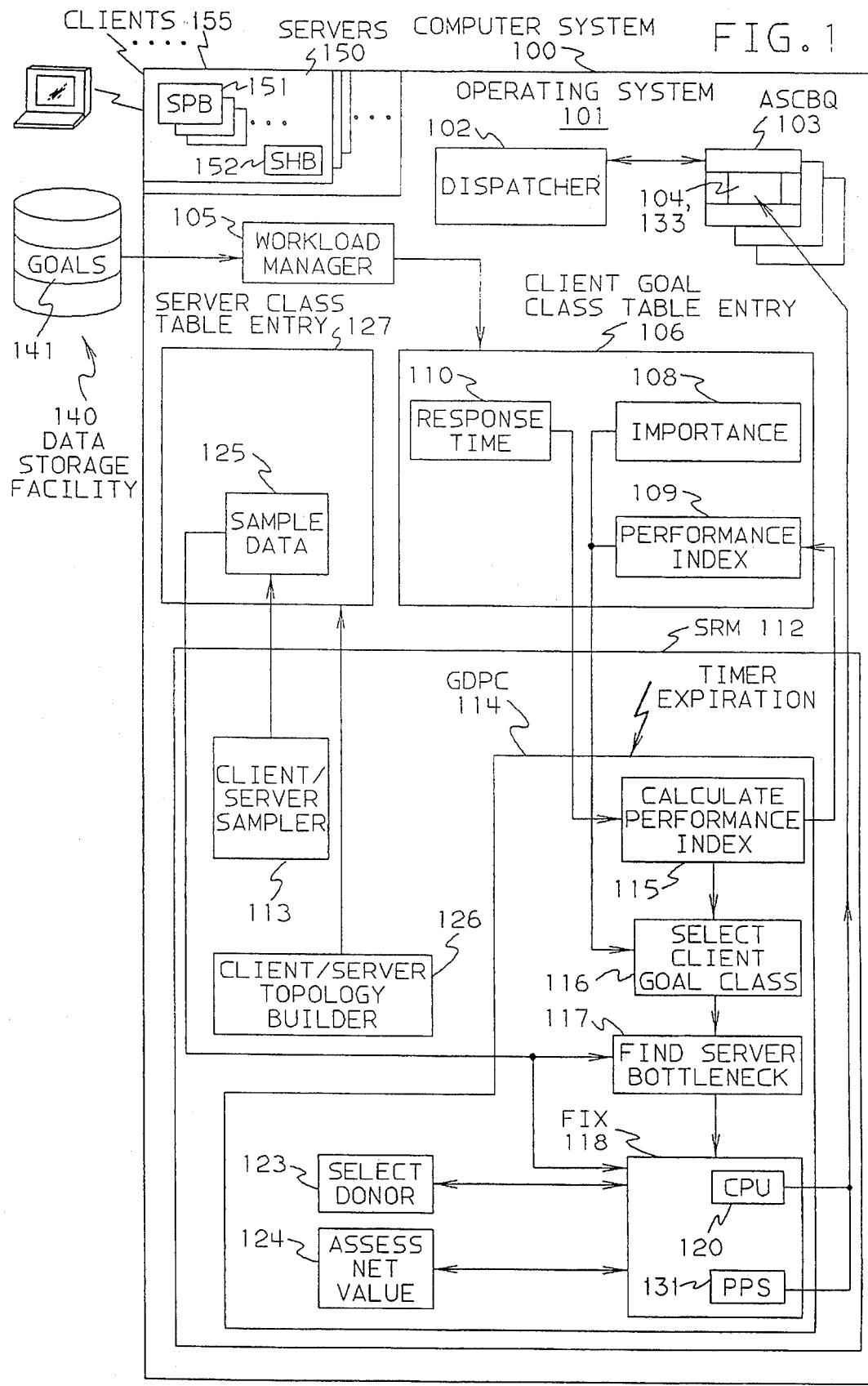
FIG. 1 is a system structure diagram showing a computer system with its controlling operating system and system resource manager component adapted as described for the present invention.

FIG. 1 illustrates the environment and the key features of the present invention. (The present invention is related to the invention described in U.S. Patent Application "APPARATUS AND METHOD FOR MANAGING A DATA PROCESSING SYSTEM WORKLOAD ACCORDING TO TWO OR MORE DISTINCT PROCESSING GOAL TYPES", by J. D. Aman et al, filed on an even date herewith and assigned to the assignee of the present invention. It is incorporated by reference hereby.) A computer system (100) is controlled by an operating system (101) such as IBM's MVS/ESA in the preferred embodiment. A dispatcher (102) is a component of the operating system that selects the unit of work to be executed next by the computer. The units of work (150) are the server programs that do the useful work that is the purpose of the server computer system. The server programs do work for and on behalf of the clients (155) in a client/server system. The clients (155) are either end users at terminals or programs executing in other computer systems. Typically, clients (155) are attached to a server computer system by communication links. Clients (155) generate messages (transactions) that are sent to the server computer system to convey the work request to a particular server. The transactions are routed to different servers for action, depending on the specific work that is requested. Performance goals are set for the clients (155); however, the performance results are a function of the servers (150) performance when doing work for the clients. The clients having the same performance goal are said to be in the same class for performance management purposes. Two data structures provide the means for relating the performance of a server work unit (150) to a client (155). A server performance block (SPB) (151) contains the identifier (FIG. 2 201) of the client performance goal class of a client currently being served by the server work unit. If more than one client is being served concurrently, then there is a server performance block for each such client. A server history block (SHB) (152) has space for an entry (FIG. 3 301) for each performance goal class defined to the system. Each such entry contains a count of the number of times the server was recently observed to be serving a client of the corresponding performance goal class.

The server units of work that are ready to be executed are represented by a chain of control blocks in the operating system memory called the address space control block (ASCB) queue (103). Each ASCB has a field that contains a relative importance (dispatching priority) value (104). The dispatching priority is adjusted by operation of the present invention and used by the dispatcher to select to be executed the highest priority unit of work from those that are ready to be executed, as determined by the ASCB queue. The dispatching priority is the most important controlled variable provided by the present invention for meeting the stated performance goals for computer system operation.

The present invention takes as input the performance goals for clients (transaction generators) These performance goals are established by a system administrator and stored (141) on a data storage facility (140). The performance goals are established in terms of transaction response time (in seconds) for each client. Included with the performance goals is the specification of the relative importance of each goal. The goals (141) are read into the system by a workload manager (WLM) component (105) of the operating system. Each of the goals specified by the system administrator causes the workload manager to establish a performance class to which individual clients will be assigned. Each performance class is represented in the memory of the operating system by a class table entry (106). The specified goals (in an internal representation) and other information relating to the performance class are recorded in the class table entry. Among the more important information stored in a class table entry is response time goal (110) (an input value), the relative importance (108) (an input value), and the performance index (109) (a computed value).

A system resource manager (SRM) component (112) of the operating system is modified according to the present invention to include a goal-driven performance-controller (GDPC) component (114) and to operate in the following manner as shown in FIG. 1. The GDPC performs the functions of measuring the achievement (109) of client performance goals (110) by monitoring server (150) performance on their behalf, selecting the client performance goal classes that are not meeting their goal, and (indirectly) improving the performance of the selected client transactions by improving the performance of the server work units (150) that have been observed to have served the selected clients. The GDPC function is performed periodically based on a timer expiration approximately every ten seconds.

At (115), a performance index is calculated for each client performance goal class table entry (106) using the specified goal (110). The resulting performance index is recorded in the corresponding class table entry (106) at (109). The concept of a performance index as a method of measuring client performance goal achievement is well known. For example, in the U.S. Patent Application cited earlier: "WORKLOAD MANAGER FOR ACHIEVING TRANSACTION CLASS RESPONSE TIME GOALS IN A MULTIPROCESSING SYSTEM" the performance index is described as the actual response time divided by the goal response time.

At (116), a client performance goal class is selected to receive a performance improvement based on the goal (110), the relative goal importance (108) and the current value of the performance index (109). The selected client performance goal class is referred to as the receiver goal class.

Client/server relationships are determined by sampling the server performance blocks (151) and recording the result in the server history block (152). The client/server topology is built (126) by extracting from the server history blocks (152) for all the servers (150) the list of client goal classes that have been recently served (that is, the sampling period set for the build topology function, described later). The list is inverted so that the result is, for each goal class, a list of the servers used by the clients assigned to that class. Client goal class server lists that contain identical lists of servers are combined since, from a performance-management standpoint, they are indistinguishable. Each of these resulting server lists forms the basis of a server class table entry (127).

The resulting server class table has an entry (127) for each unique combination of servers and client goal classes. If necessary, the server class table is reconstructed periodically to accommodate changes in the client/server relationships that may occur over time. In the preferred embodiment, for example, the server class table is reconstructed every minute.

Once the receiver goal class has been selected, a corresponding server class is selected to receive the benefit of the resource actions. The server class performance bottleneck is determined (117) relative to the controlled variables by using state samples (125), a well known technique. The controlled variables are protective processor storage target (133) and dispatch priority (104).

At (118) the potential changes to the controlled variables are considered. A client performance goal class is selected (123) for which a performance decrease can be made based on the relative goal importance (108) and the current value of the performance index (109). The selected client performance goal class is referred to as the donor. The corresponding server class determines which server(s) will potentially donate resources to the receiver server(s). Next, the contemplated changes are assessed (119) for net value relative to the expected changes to the performance index for both the receiver and the donor. That is, if the result will yield more improvement for the receiver than harm to the donor relative to the goals, then one or more of the following controlled variables is adjusted: dispatch priority (120) (104) and the swap protect time target (132) for both the donor and the receiver.

The goal driven performance controller (GDPC) function is performed periodically, for example once every ten seconds, and is invoked via a timer expiration. The functioning of the GDPC provides a feedback loop for the incremental detection and correction of performance problems so as to make the operating system adaptive and selftuning.

Each server work unit has one or more performance blocks and a server history block. A performance block contains an identifier for the transaction class the server is serving. If a server is serving multiple transactions at a given time, the server will have multiple Performance Blocks.

Figure 2:
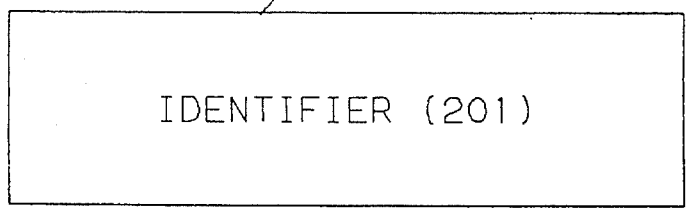
FIG. 2 shows the server performance block.

FIG. 2 shows the server performance block (151) in more detail. The server performance block contains the identifier (201) of the client performance goal class for which the server is currently performing service. If the server is currently performing service for more than one goal class, then there is an instance of the server performance block for each goal class being concurrently served.

Figure 3:
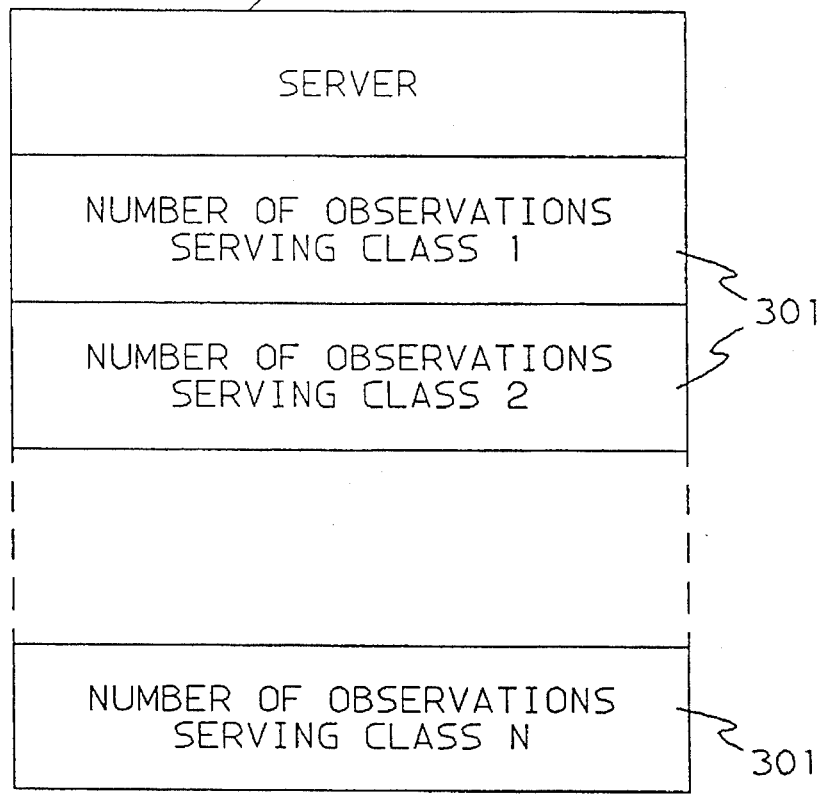
FIG. 3 shows the server history block.

The client/server relationship are determined by sampling. The number of observations when a particular server is observed to be serving a particular performance goal class is recorded in the server history block for that server. FIG. 3 shows the server history block in more detail. Each server's Performance Blocks are sampled periodically, for example, four times a second in the preferred embodiment, and the observations are recorded in the associated server history block in the entry that corresponds to the performance goal class.

BUILD TOPOLOGY

Figure 4:
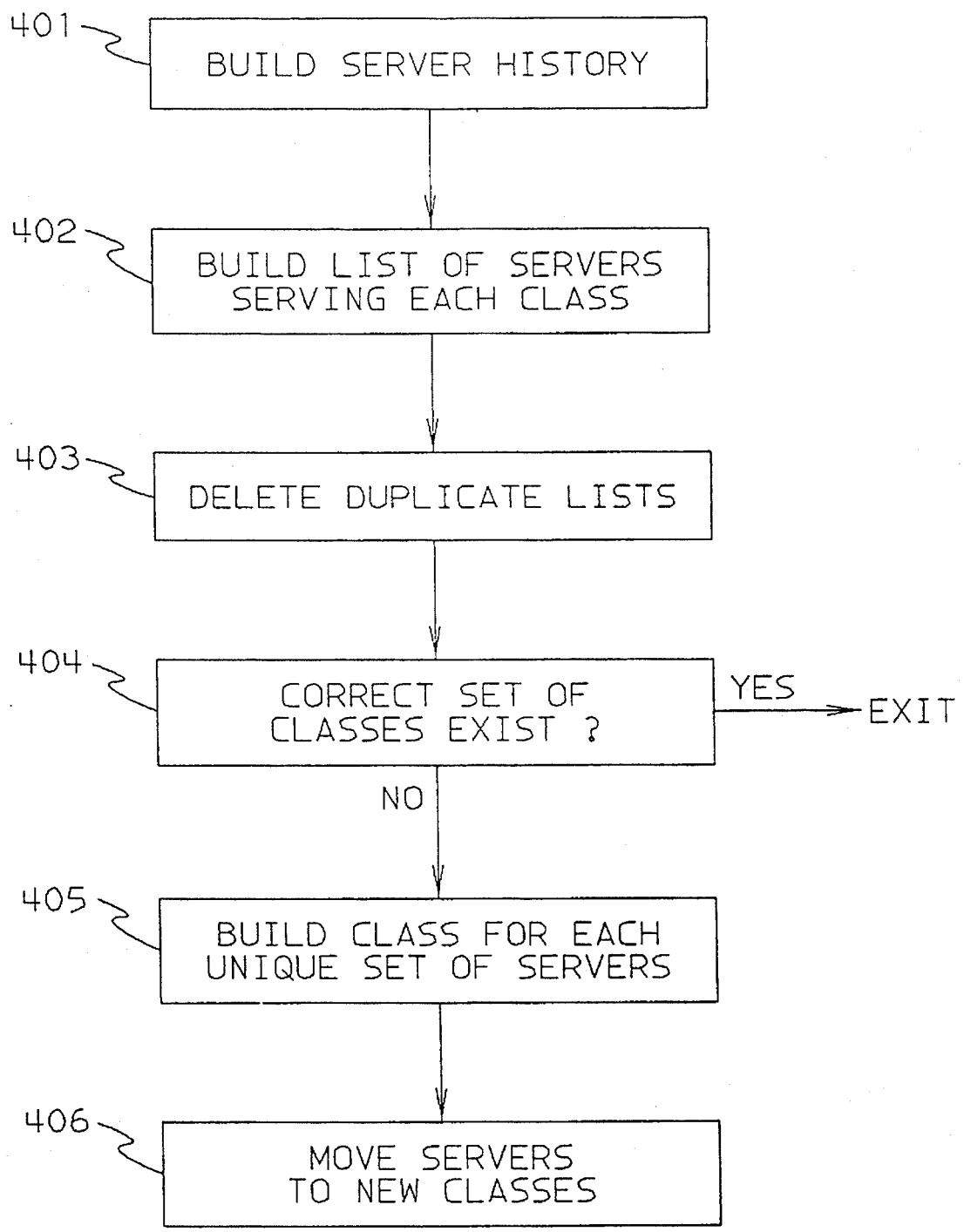
FIG. 4 is a flowchart showing the logic for the build topology function.

FIG. 4 illustrates building the client/server topology (126). At (401), a set of client/server observations is built for each server from the observations collected in the server history block. The sample set is built from samples collected over a long enough time interval to get a representative picture of which client classes the server is serving. This time interval may vary depending on activity but is generally in the range of several minutes.

At (402), a list is built of the servers serving each client class. At (403) duplicate sets of servers are eliminated resulting in the minimum set of server classes needed. All the servers that serve exactly the same set of client classes are grouped in single server class for management purposes.

At (404) a check is made to determine whether the correct set of server classes has already been built. This is the normal case because the client/server relationships are reassessed relatively frequently, approximately once a minute. If the current set of server classes does not reflect the current client/server topology, server classes are added or deleted as needed at (405). Then, at (406), servers are moved to the new server classes to be managed to their client's goals.

PRIMARY PROCESSING STEPS

Figure 5:
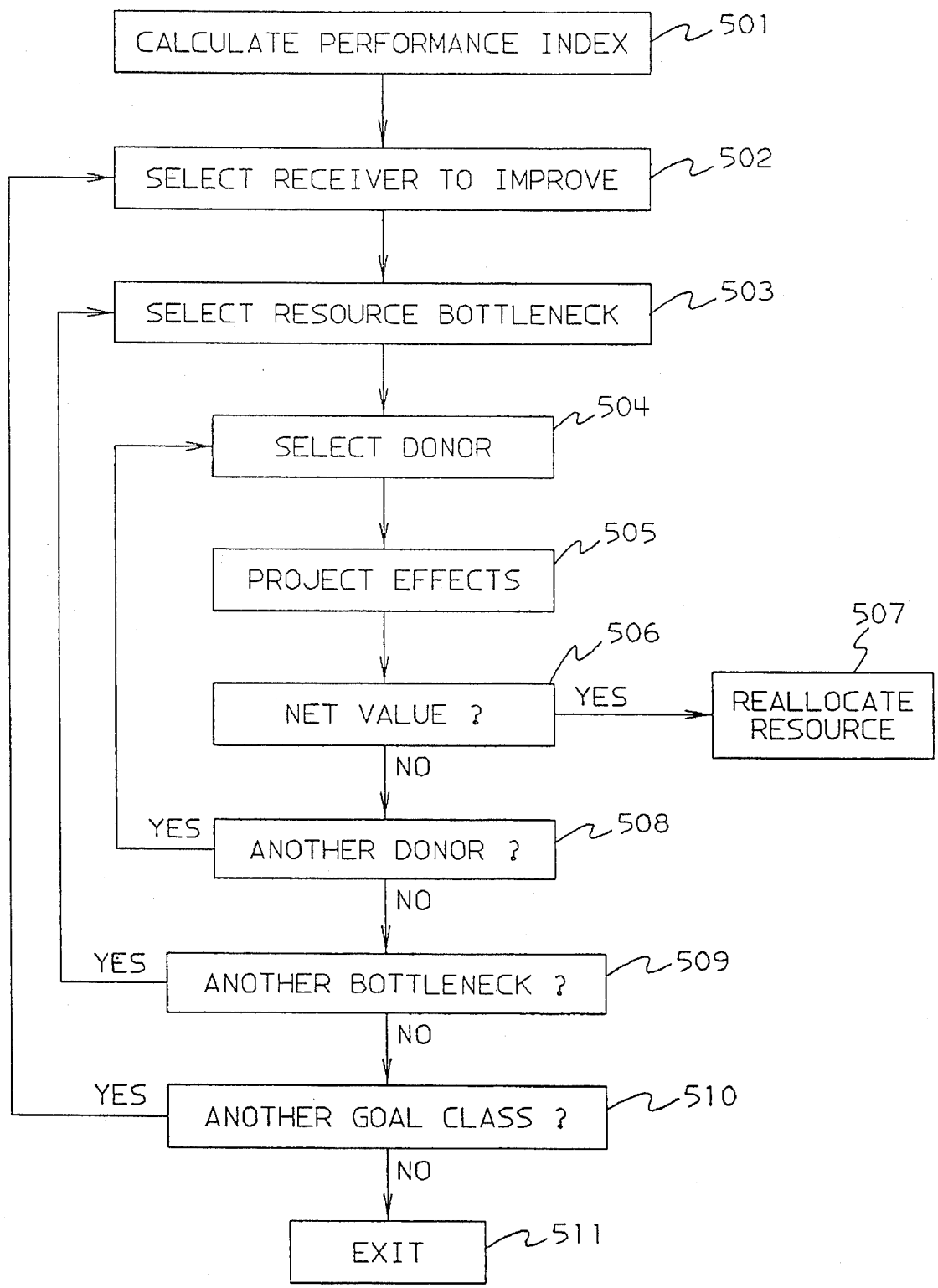
FIG. 5 is a flowchart showing the overall logic flow in the goal-driven performance-controller component.
Figure 19:
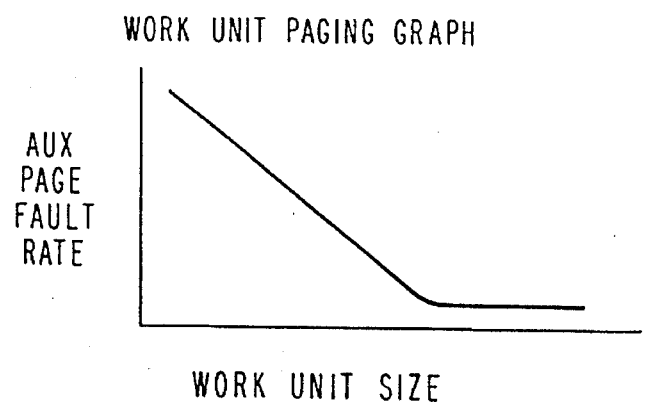

FIG. 5 is a flowchart showing the logic flow for the primary processing steps of the present invention. At (501), a performance index is calculated for each client performance goal class and the current values are calculated for the proportional aggregate speed graph (FIG. 10) and the work-unit-paging graph (FIG. 19). The performance index calculation is described later. At (502), a client performance goal class, referred to as the receiver, is selected to have its performance improved. The selection process is shown in more detail in FIG. 6. Once the receiver goal class is selected, a corresponding server class is selected as the receiver server class. At (503), one of the receiver server class resource bottlenecks is selected as the bottleneck to address. Bottleneck selection is shown in more detail in FIG. 8. At (504), server classes that own the resource identified as required to improve the performance of the receiver goal class are selected. These selected server classes are referred to as donors. Donors are selected in reverse order to receivers, that is, the server classes are selected that correspond to the client goal classes having the best performance indexes and least importance. Donor selection is shown in more detail in FIG. 11.

At (505) the effects of the resource reallocation from the donor to the receiver are projected. The algorithms used to project the effects of resource reallocation depend on the resource involved.

At (506), the net value of reallocating the resource from the donor or donors to the receiver is assessed. A receiver will only be improved by reallocating resource from a specific donor if there is projected to be net value to the resource reallocation. If using a donor to improve a receiver is projected to result in more harm to the donor than improvement to the receiver relative to the goals and importance, the resource reallocation is not done. Net value assessment is shown in more detail in FIG. 12.

If there is net value to the reallocation, the resources are reallocated from the donor or donors to the receiver at (507). If there is not net value, a check is made at (508) to determine whether there is another potential donor.

If there is another potential donor, control passes to (504) to select another potential donor. If there are no more potential donors of the resource required to address the selected bottleneck, a check is made at (509) to determine whether the receiver has another bottleneck.

If the receiver has another bottleneck that can be addressed, control returns to (503) to select another bottleneck. If the receiver has no more bottlenecks to address, a check is made at (510) to determine whether there is another potential receiver goal class.

If there is another potential receiver goal class, control returns to (502) to select another potential receiver goal class. If there are no more potential receivers, the goal driven performance controller function is complete for the present iteration (511).

The GDPC function is invoked again when the periodic timer next expires, providing feedback on the effect of the resource reallocations made previously and again providing the opportunity to address performance problems.

PERFORMANCE INDEX

The performance index is calculated for response time goals (115) as follows:

(performance index)=(actual response time)/(response time goal)

The performance index is actual response time divided by the response time goal for client performance goal classes.

A performance index of 1.0 indicates the client performance goal class is exactly meeting its goal. A performance index greater than one indicates the class is performing worse than its goal, and a performance index less than 1.0 indicates the class is performing better than its goal.

For response time goals, the performance index is calculated from enough recent response completions to be representative of the results for the class. For example, the preferred embodiment takes samples for thirty seconds or accumulates ten samples, whichever is less.

SELECT RECEIVER TO IMPROVE

Figure 6:
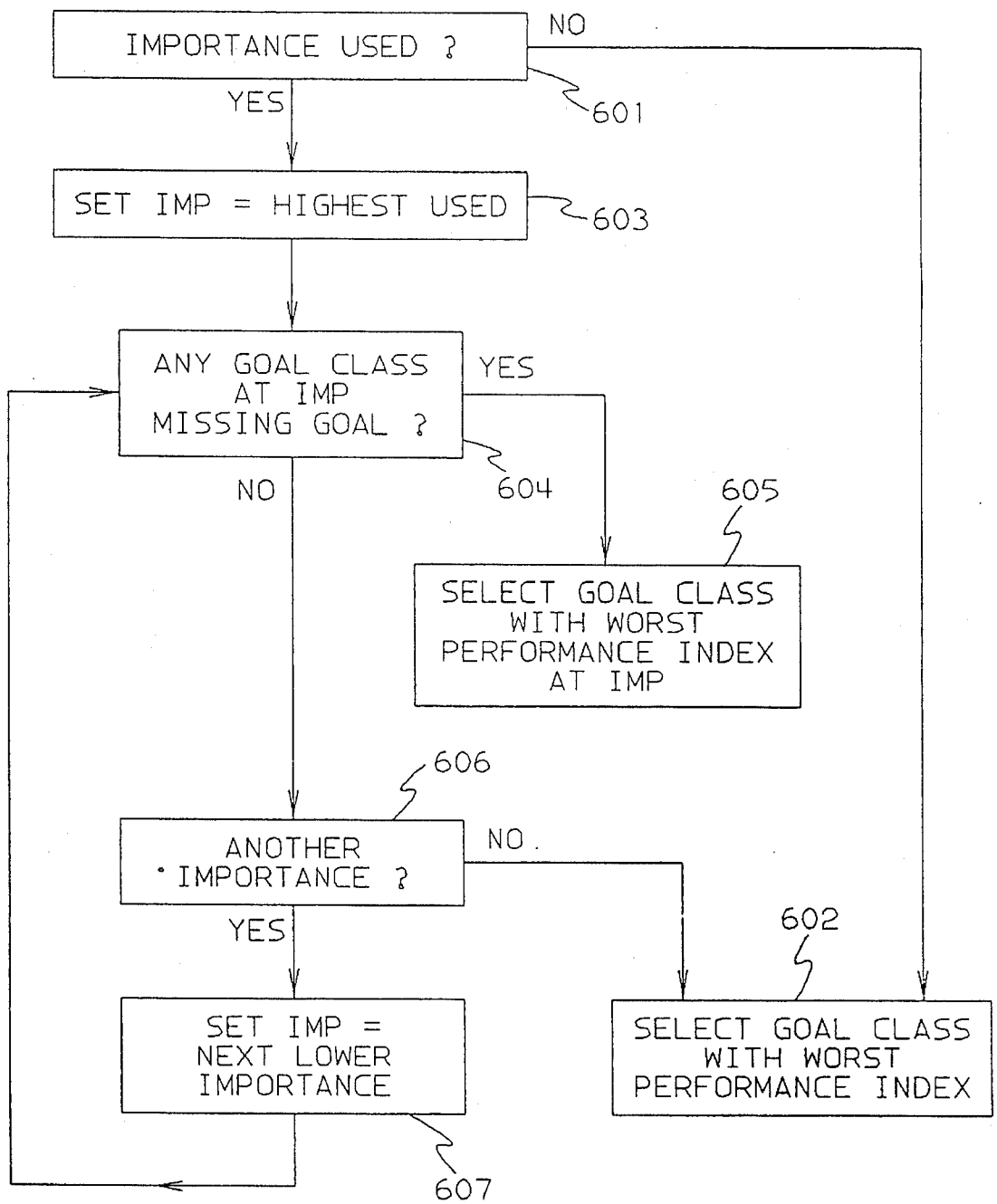
FIG. 6 is a flowchart showing logic flow for the select-receiver function.

FIG. 6 shows a flow chart of the logic flow for selecting a performance goal class to receive a performance improvement (116). At (601) the performance goal class table is searched to determine whether any entries have an associated importance value. Importance values are optional when specifying the performance goals. If no importance values have been specified for any of the goal classes, the goal class having the worst (highest) performance is selected (602). If importance values have been specified, the importance value to be considered is initialized to the highest importance value specified for any performance goal class (603). At the importance being considered, all performance goal classes having that importance are assessed for underachieving their respective performance goal (604). The worst underachiever at the importance value being considered, if any, is selected as the receiver (605). If there are no underachieving performance goal classes at the importance being considered (604), then if another, lower importance value has been specified (606), the next lower importance value specified is set to be considered (607) and control returns to (604). If there are no underachieving performance goal classes at all, then the worst-performing performance goal class is selected as the receiver (602), as if no importances were used.

FIND BOTTLENECK

In the present invention, both a bottleneck (target) server and a bottleneck (target) resource must be selected. That is, a target server is selected by apportioning delay samples among the servers serving the selected client goal class, and a target resource is also selected by apportioning, both as described later in this specification.

DATA FOR FIND BOTTLENECK

Figures 7, 8:
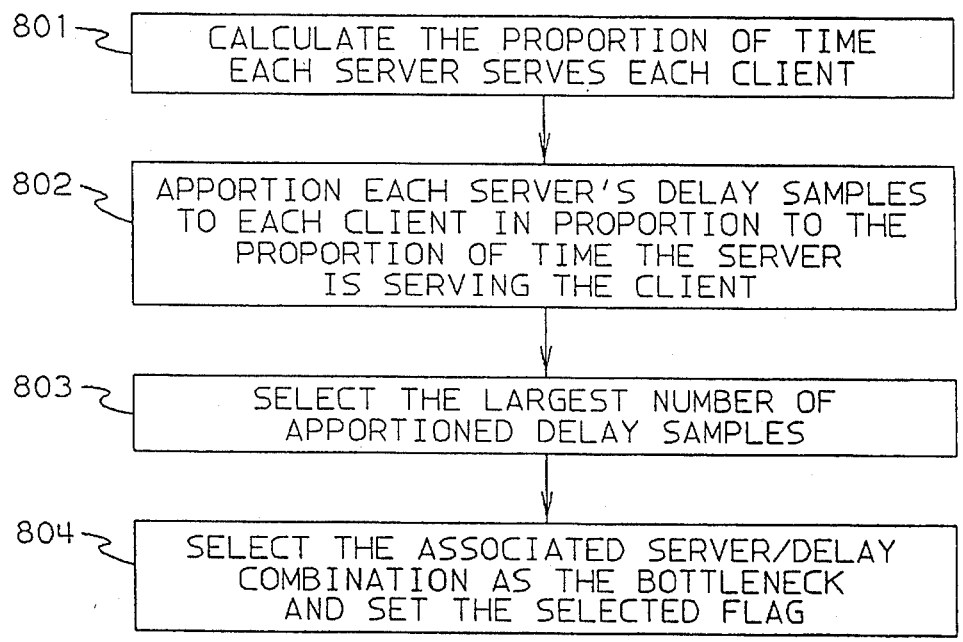
FIG. 7 illustrates the state data used to select resource bottlenecks.
FIG. 8 is a flowchart showing logic flow for the find-bottleneck function.

FIG. 7 illustrates the data used to select the server and resource bottlenecks to address. For each server/delay combination, n, the data contains the number of server Sn (702), delay type Dn (704), samples apportioned to the selected receiver (client) goal class (701), and a flag indicating whether the server/delay combination has already been selected as a bottleneck for the receiver goal class in question during the current invocation of the goal driven performance controller (703).

FIND BOTTLENECK OPERATION

FIG. 8 illustrates the operation of the find bottleneck function (117). Find bottleneck operates on a server class that corresponds to the selected receiver goal class. The selection of bottleneck to address is made by selecting the server/delay combination with the largest number of samples that has not already been selected during this invocation of the GDPC. When a server/delay combination is selected, the flag is set so the server/delay combination is skipped if the find bottleneck function is reinvoked for this receiver during the current invocation of the GDPC.

At (801), the proportion of time each server serves each client goal class is calculated. This proportion is equal to the number of times server Sn was observed serving client class Cn divided by the total observations of that server serving any client. Since the client/server relationships may not be static, samples are aged out after a few minutes so that the client/server proportions change as client/server relationships change.

At (802), each server's delay samples are apportioned to each client class in proportion to the time the server is serving the client class. Therefore, the number of samples (701) for delay type Dn apportioned to client class Cn from server Sn are that server's total samples of delay, times the proportion of time server Sn is observed serving client class Cn.

At (803), the delay type having the largest number of samples apportioned to the receiver goal class is selected as the resource bottleneck delay type to be addressed on behalf of the receiver goal class. At (804), the server that experienced the bottleneck delay is selected as the bottleneck server.

FIXING DELAY

This section describes how the receiver performance goal class performance is improved by changing a controlled variable to reduce the delay selected by the find bottleneck function.

GENERAL FIX FLOW

Figure 9:
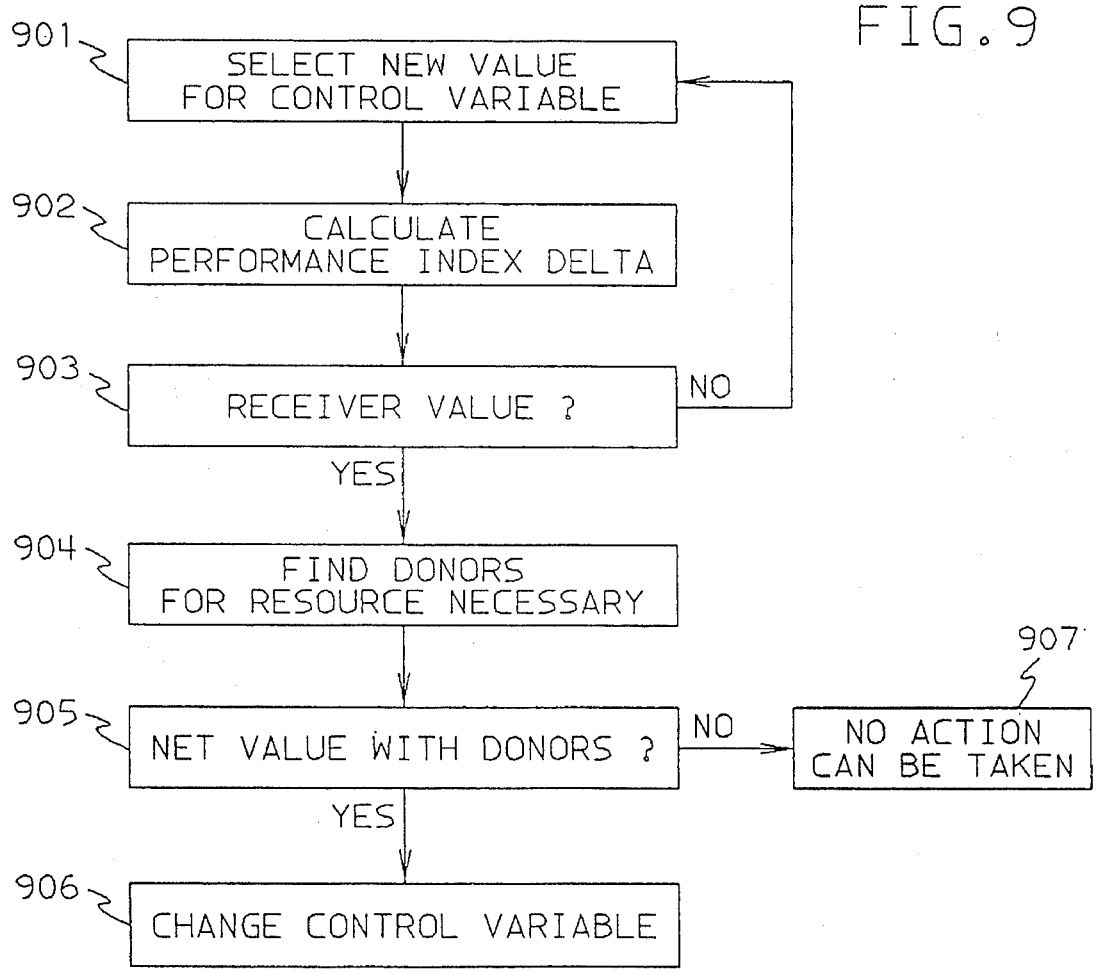
FIG. 9 is a flowchart showing logic flow for the fix function.

FIG. 9 illustrates at a high level a flow chart of the steps required to assess improving a receiver goal class performance by changing the controlled variable related to the chosen resource bottleneck (118). At (901), a new value is chosen for the controlled variable. At (902), the change to the performance index is calculated for the receiver performance goal class. The details of this calculation are specific to individual resources and are described below. At (903), the improvement in the performance index is checked to determine whether the change results in sufficient value to the receiver goal class. If there is not sufficient receiver value, control returns to (901) where a value is chosen for the controlled variable that will result in greater benefit for the receiver goal class.

When there is sufficient receiver value, control passes to (904) where select donor is called to find donors of the resource needed to make the control variable change. At (905), a check is made to determine whether the contemplated change has net value. For the contemplated change to have net value, the benefit to the receiver goal class in relation to goals and importance must be more than the harm to the donor goal class(es). If the contemplated change does have net value, the controlled variable is changed at (906). If there is not net value, the chosen resource bottleneck cannot be fixed (907).

PERFORMANCE INDEX DELTA

The performance index value for a client performance goal class is the measure of how well that goal class is meeting its specified goal. The measure of whether a contemplated resource reallocation has value to the receiver goal class is the projected change in the performance index (index delta) of the receiver goal class that occurs as a result of the contemplated resource reallocation. Similarly, the measure of the net value of a contemplated resource reallocation is the improvement in the index delta of the receiver goal class relative to the degradation of the index deltas of the donor goal classes.

PROPORTIONAL AGGREGATE SPEED

In the client/server system of the present invention, improving the performance of a server will only improve the performance of a client performance goal class in proportion to the extent to which the server serves clients assigned to that client performance goal class.

In this invention, we introduce the concept of proportional aggregate speed for a client performance goal class. The proportional aggregate speed of a client goal class is the apportioned speed of all the servers serving it. The proportional aggregate speed for each client goal class is determined by allocating all of the client's server's state samples to the client performance goal class in proportion to the number of times each server was observed serving each client goal class. These are the samples shown in FIG. 7 (Data For Find Bottleneck).

The proportional aggregate speed of a client performance goal class is defined as the total CPU-using samples apportioned to the client performance goal class from all servers (that is, the servers in the corresponding server classes), divided by the total CPU-using plus all delay samples apportioned to the client performance goal class from all servers. Proportional aggregate speed is calculated for each client goal class as follows:

$$(\text{proportional aggregate speed}) = \frac{(\text{apportioned } CPU\text{-using samples})}{(\text{apportioned } CPU\text{-using samples}) + (\text{apportioned delay samples})}$$

PROPORTIONAL AGGREGATE SPEED GRAPH

Figure 10:
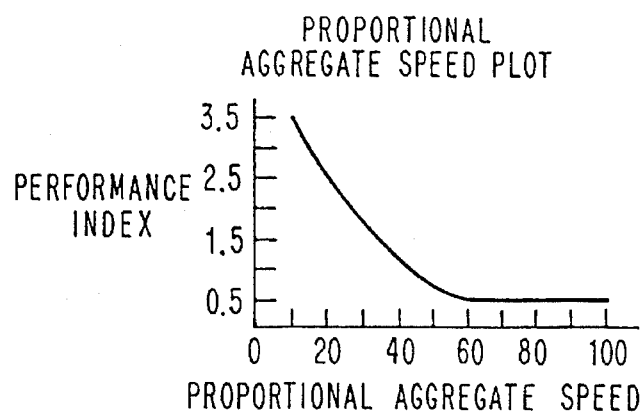
FIG. 10 is an illustrative graph showing proportional aggregate speed versus performance index.

The proportional aggregate speed graph, illustrated in FIG. 10, is introduced for the purpose of projecting performance index deltas in a client/server environment. The proportional aggregate speed graph is represented in computer memory by a table of calculated proportional aggregate speed and the corresponding calculated performance index pairs of values, arranged in proportional-aggregate-speed order.

When a performance index must be projected for a contemplated resource reallocation, a new proportional aggregate speed is calculated from the projected new delays for the servers with respect to the reallocated resources. and the new, projected performance index is read or interpolated from the table (that is, "read from the graph").

SELECT DONOR

Figure 11:
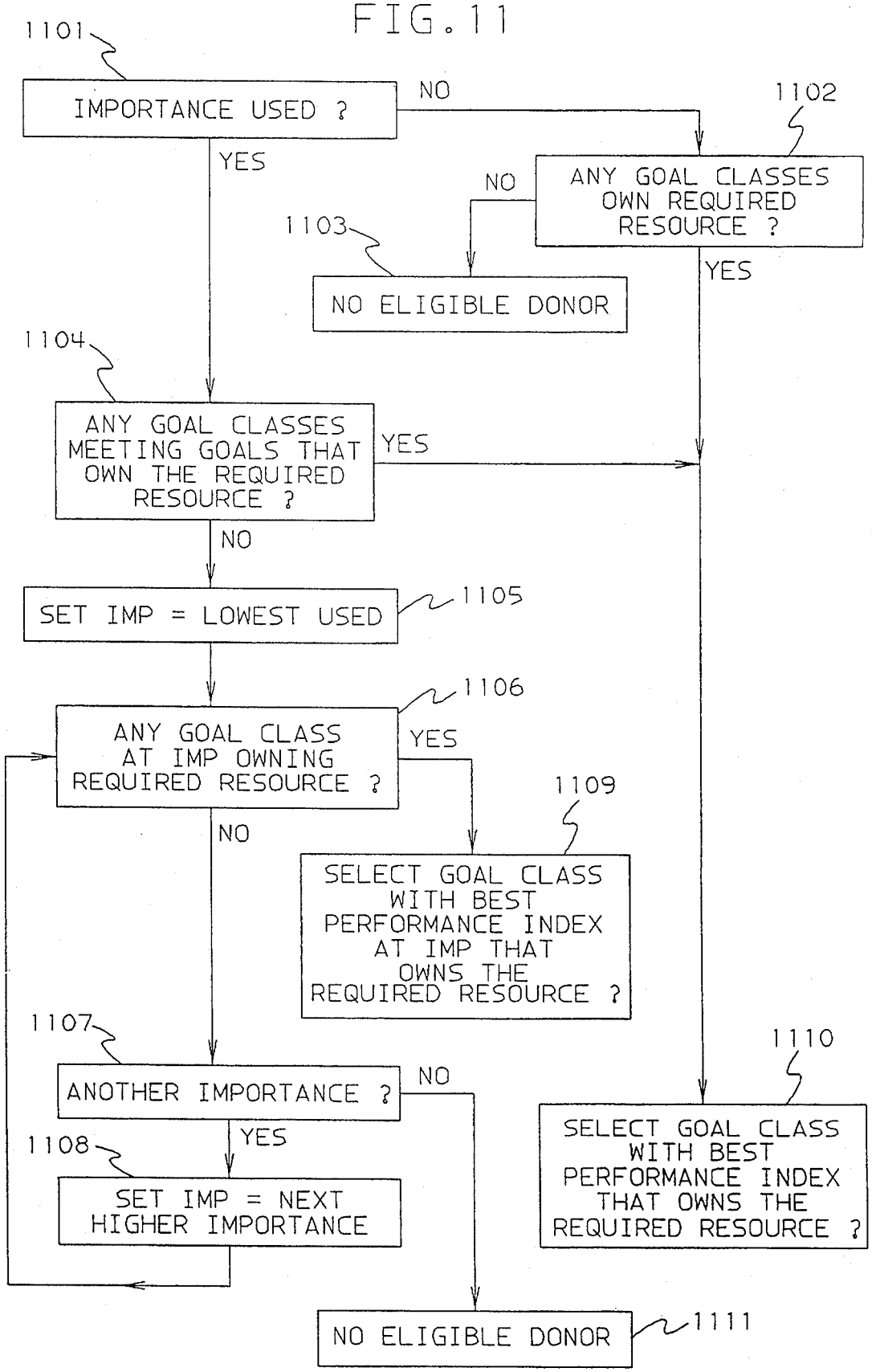
FIG. 11 is a flowchart showing logic flow for the select-donor function.

FIG. 11 is a flowchart showing logic flow for the select-donor function (123). The purpose of the select-donor function is to choose from the set of goal classes the most eligible goal class to have its performance reduced in favor of the receiver goal class. These actions are accomplished by taking the required resources from a server class that corresponds to the donor goal class and giving the resources to a server class that corresponds to the receiver goal class.

At (1104) select donor determines whether there are any goal classes that are meeting goals and have corresponding server classes that own the required resource. If there are such goal classes, select donor chooses as the donor the goal class with the best performance index (1110). Importance is not used by select donor to differentiate among goal classes that are currently meeting their specified goals. If there is no goal class that is both meeting its goal and has a corresponding server class that owns the required resource, select donor finds the goal classes that have the lowest specified importance and have corresponding server classes that own the required resource (1105–1108). If such a set of goal classes exists, select donor chooses the goal class having the best performance index (1109). If there is not at least one such goal class, then there is no eligible donor in the system (1111).

ASSESS NET VALUE

Figure 12:
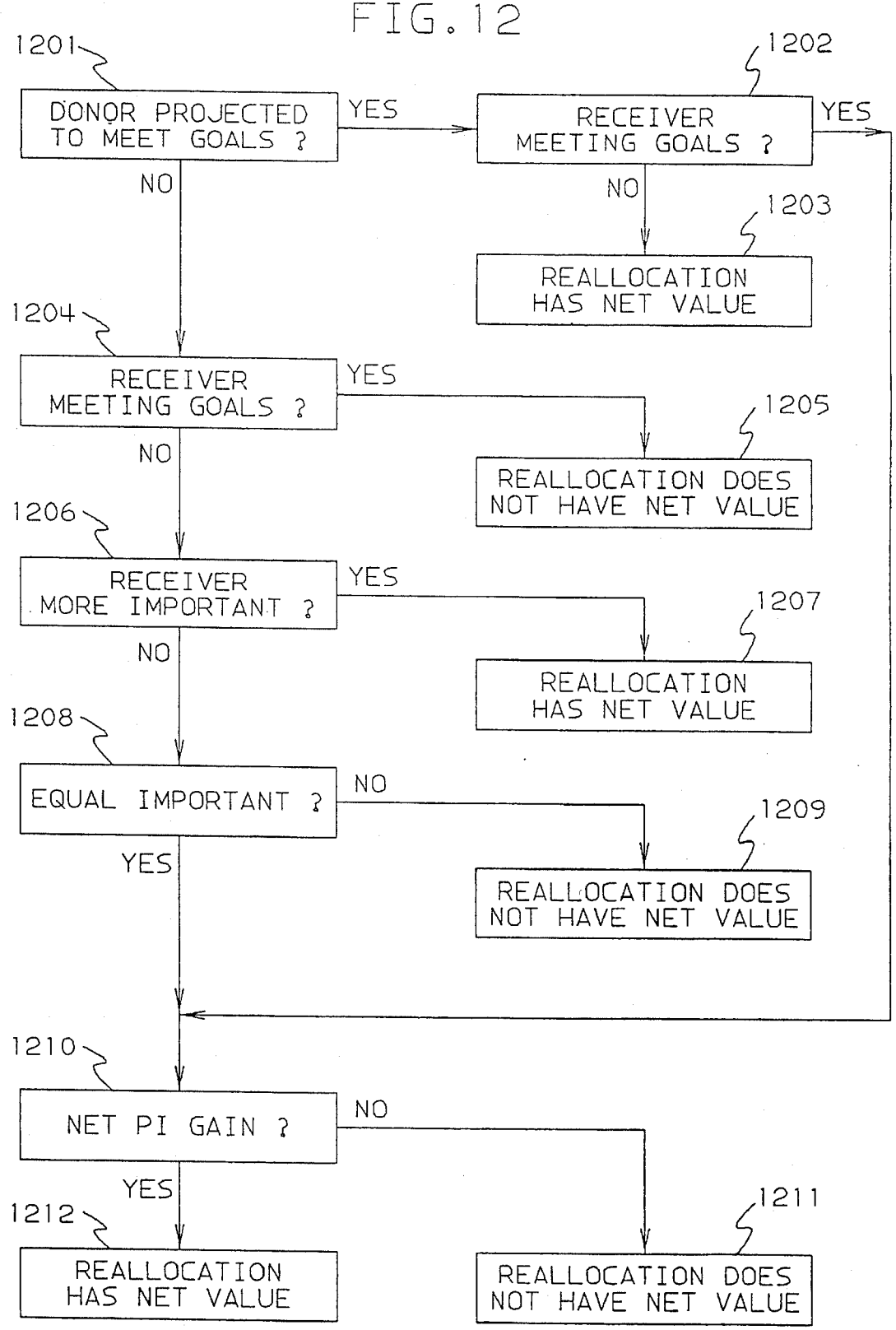
FIG. 12 is a flowchart showing logic flow for the assess-net-value function for contemplated changes.

FIG. 12 illustrates the steps used to determine the net value of a reallocation of resources between the receiver and the donor (124). If the donor goal class is projected to meet its goal (1201) and the receiver goal class is missing its goal (1202), the reallocation has net value (1203). If the donor is projected to miss its goals and the receiver is meeting its goals the action does not have net value (1205). If both the donor and the receiver are missing goals, the reallocation has net value if the receiver is more important than the donor (1207) and does not have net value if the donor is more important the receiver (1209). At (1210) either both the receiver and donor are missing goals and are equally important or both are meeting goal. In this case the reallocation has net value if it causes a net performance index (PI) gain. A resource reallocating has a net performance index gain if both of the following conditions are true:

1. The projected performance index value decrease (performance improvement) for the receiver is more than the projected performance index value increase (performance degradation) of the donor.
2. If the receiver is projected to have a lower performance index value (better performance) than the donor, the receiver's performance index value must be projected to be closer to the donor's performance index value after the reallocation than before.

For item 1 above, when comparing the projected performance index decrease of the receiver to the projected performance index increase of the donor, the receiver only gets credit for the part of its performance index value decrease above 0.90. Similarly, the donor only gets credit for the part of its performance index value increase above 0.90. For example, if the receiver's performance index value was projected to improve from 1.50 to 0.70, the performance index decrease used in the comparison would be 0.60.

In the present invention, it is possible that multiple client performance goal classes have the same corresponding server class, as constructed by the build topology function. Therefore, all client goal classes that have the same corresponding server class as the receiver goal class or donor goal class must be checked for net value, since all those goal classes would be affected by the contemplated resource reallocation. This includes the case where a client goal class may be served by both the receiver server class and the donor server class.

VALUE FOR THE RECEIVER PERFORMANCE GOAL CLASS

Checking for sufficient receiver goal class value is an optimization. A receiver goal class will only be helped if there is projected to be sufficient value. A contemplated resource reallocation is said to have receiver goal class value if it meets a minimum performance index improvement criterion. For example, in the preferred embodiment, a contemplated change must be projected to improve the receiver goal class performance index by at least 10 percent of the difference between the receiver goal class current performance index and 1.00. The receiver value criterion is designed to reject very small improvements. The reason to reject actions for too little receiver value is to avoid making changes that yield only marginal improvements.

CPU DELAY

Figure 13:
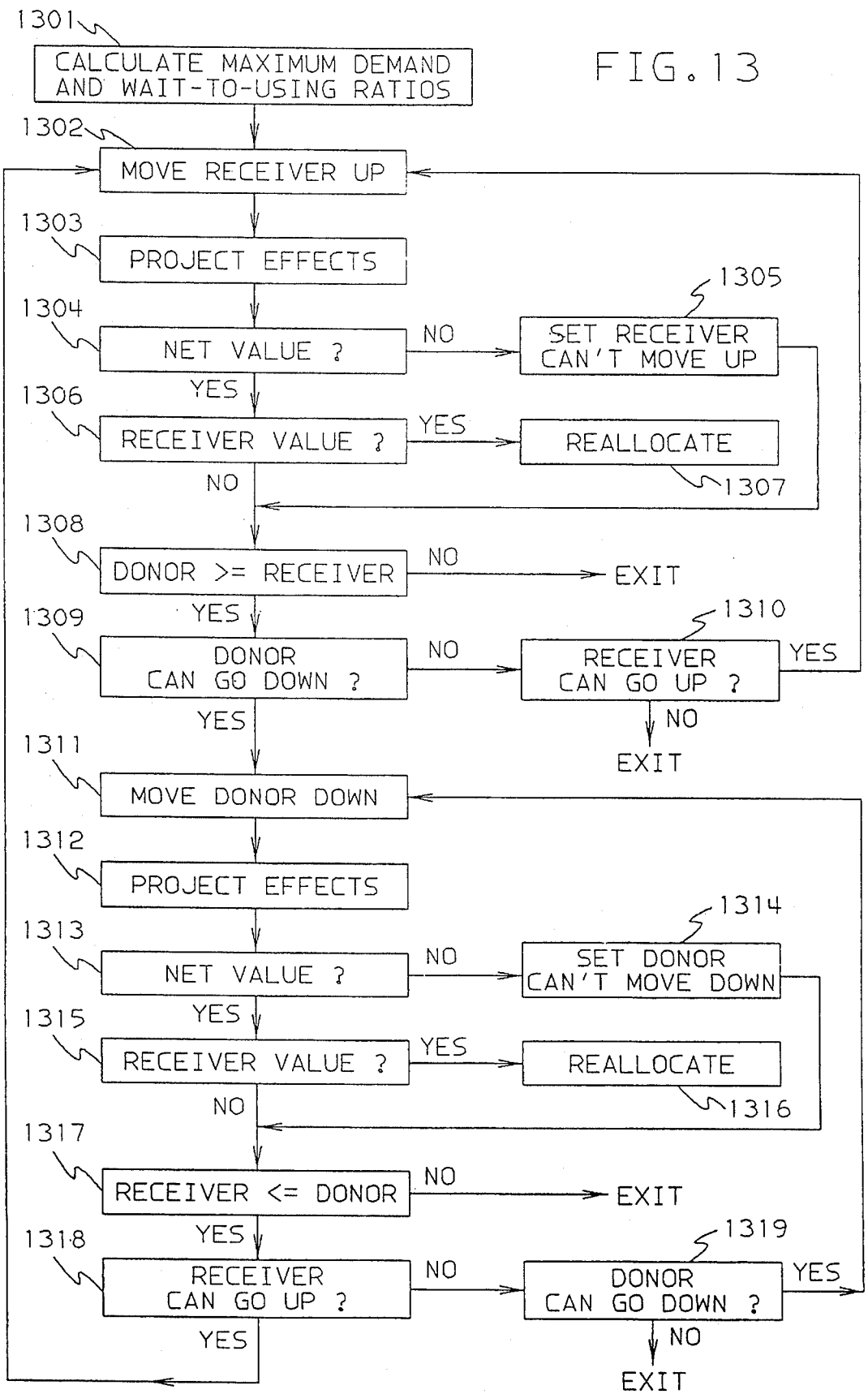
FIG. 13 is a flowchart of the steps to assess improving performance by increasing dispatch priority.

This section describes improving performance by reducing the CPU delay experienced by the receiver performance goal class (120). FIG. 13 illustrates the steps to find a new set of dispatching priorities to be used to improve the receiver goal class performance without inequitably harming the donor goal class performance.

At (1301), the maximum demand and wait-to-using ratios are calculated for each server class and accumulated for all the server classes at each priority. A table of these values is constructed where each row represents the dispatch priority and the two columns are the wait-to-using ratio and the maximum demand, accumulated for all the server classes at the corresponding dispatch priority value. This table is called the wait-to-using table and is used to project new wait-to-using values for a contemplated new dispatch priority, as described later. Wait-to-using ratios (CPU delay samples divided by CPU-using samples) are a well known concept in computer systems performance measurement. Maximum demand is new. Maximum demand is the theoretical maximum percentage of total CPU time that a service period can consume if it has no CPU delay. The maximum demand calculation is shown later in this specification.

Figure 14:
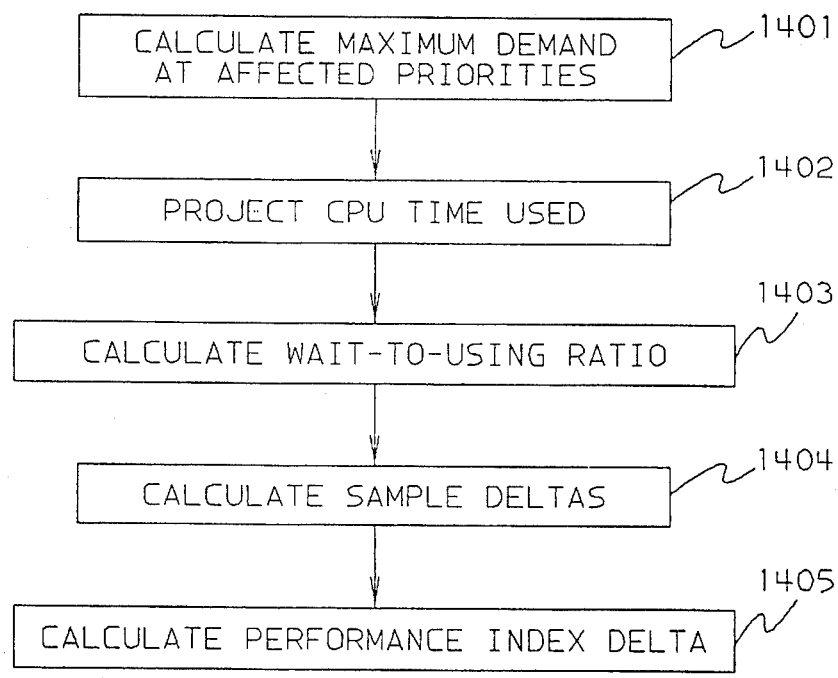
FIG. 14 is a flowchart showing logic flow for projecting the effects of changing dispatching priorities.

Steps (1302) through (1309) illustrate alternately assessing increasing dispatching priority of each server in the server class that corresponds to the receiver client performance goal class ("moving the receiver up") and decreasing the dispatching priority of every server in the server class that corresponds to the donor client performance goal class ("moving the donor down") until the combination of moves produces sufficient receiver goal class value or insufficient net value. The steps to project the effects of a move (1307 and 1312) are illustrated in FIG. 14 (and further developed in FIGS. 15–17). The net value check is the same as used in FIG. 12. If either net value check fails, secondary donors and receivers are selected to be moved up with the receiver or down with the donor to determine whether that combination of moves will pass the net value check.

If the combination of moves passes the net value check, secondary receivers and donors are moved along with the primary receiver and donors. Secondary donors and receivers are not found via the select donor function and the select receiver function; instead, secondary receivers are defined as those performance goal classes: 1) having a corresponding server class where the servers have a dispatch priority below the dispatch priority of the server class corresponding to the primary receiver and 2) that failed the net value check. Analogously, secondary donors are those performance goal classes: 1) having a corresponding server class where the servers have a dispatch priority above the dispatch priority of the server class corresponding to the primary donor and 2) that failed the net value check.

MAXIMUM DEMAND CALCULATION

Maximum demand is calculated as follows:

$$\text{maximum demand percentage} = \frac{(\text{number of work units}) \times (CPU\text{-using samples}) \times (100)}{(\text{total samples}) - (CPU \text{ delay samples})}$$

Maximum demand is the theoretical maximum percentage of total CPU time the servers can consume on behalf of the clients in a given goal class if the servers had no CPU delay.

ASSESS PRIORITY CHANGES

FIG. 14 illustrates the steps to project the effects of changing dispatching priorities. At (1401), the maximum demand of the server class whose dispatch priority is to be changed is subtracted from its "from" (current) priority and added to its "to" (contemplated new) priority. At (1402), the CPU time projected to be used by each server class affected by the dispatch priority change is projected by reading from a graph the achievable demand percentage for each class (FIG. 15), and then multiplying the achievable demand percentage by the total time available in the system. At (1403), new wait-to-using ratios are projected, at (1404) CPU-using and delay sample deltas are calculated, and at (1405) a performance index delta is calculated for each client performance goal class affected by the change in dispatch priority of the servers in the corresponding server class.

ACHIEVABLE DEMAND GRAPH

Figure 15:
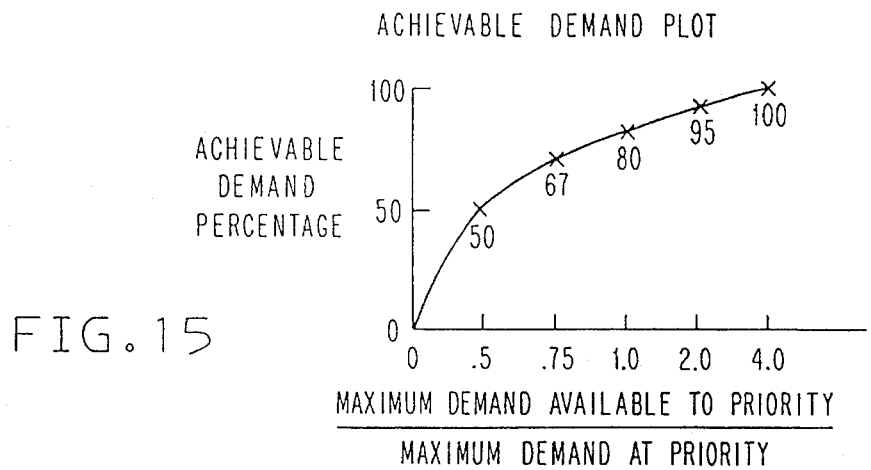
FIG. 15 is an illustrative graph showing achievable demand and a table of the data points used in the preferred embodiment.

FIG. 15 shows the achievable demand graph. The abscissa value is the quotient of the maximum demand available to a dispatch priority, divided by the total maximum demand at that dispatch priority. The maximum demand available to a dispatch priority is 100 minus the cumulative maximum demand at all dispatch priorities above the subject performance goal class dispatch priority. The maximum demand available to a dispatch priority cannot be less than zero in this calculation. The maximum demand at a dispatch priority is the total maximum demand for all classes at that dispatch priority.

The ordinate value of the achievable demand maximum demand at that dispatch priority graph is the achievable demand percentage. The achievable demand percentage is the percentage of the maximum demand of a class that the class is projected to consume, given the maximum demand of all work at higher dispatching priorities and the maximum demand of all work at the same priority.

To project the CPU time to be used (1402), the achievable demand percentage for a server class is read from the achievable demand graph. The achievable demand percentage is used to project CPU time consumption. CPU time consumption is calculated by multiplying achievable maximum demand by the maximum demand at of the class times total CPU time.

This graph differs from the others used in the present invention by the fact that all values for this graph are hardcoded. For all the other graphs, observations of real data from the running system are used. The values for the achievable demand graph were derived from modeling. The values used in the preferred embodiment are shown in the table in FIG. 15.

Figure 16:
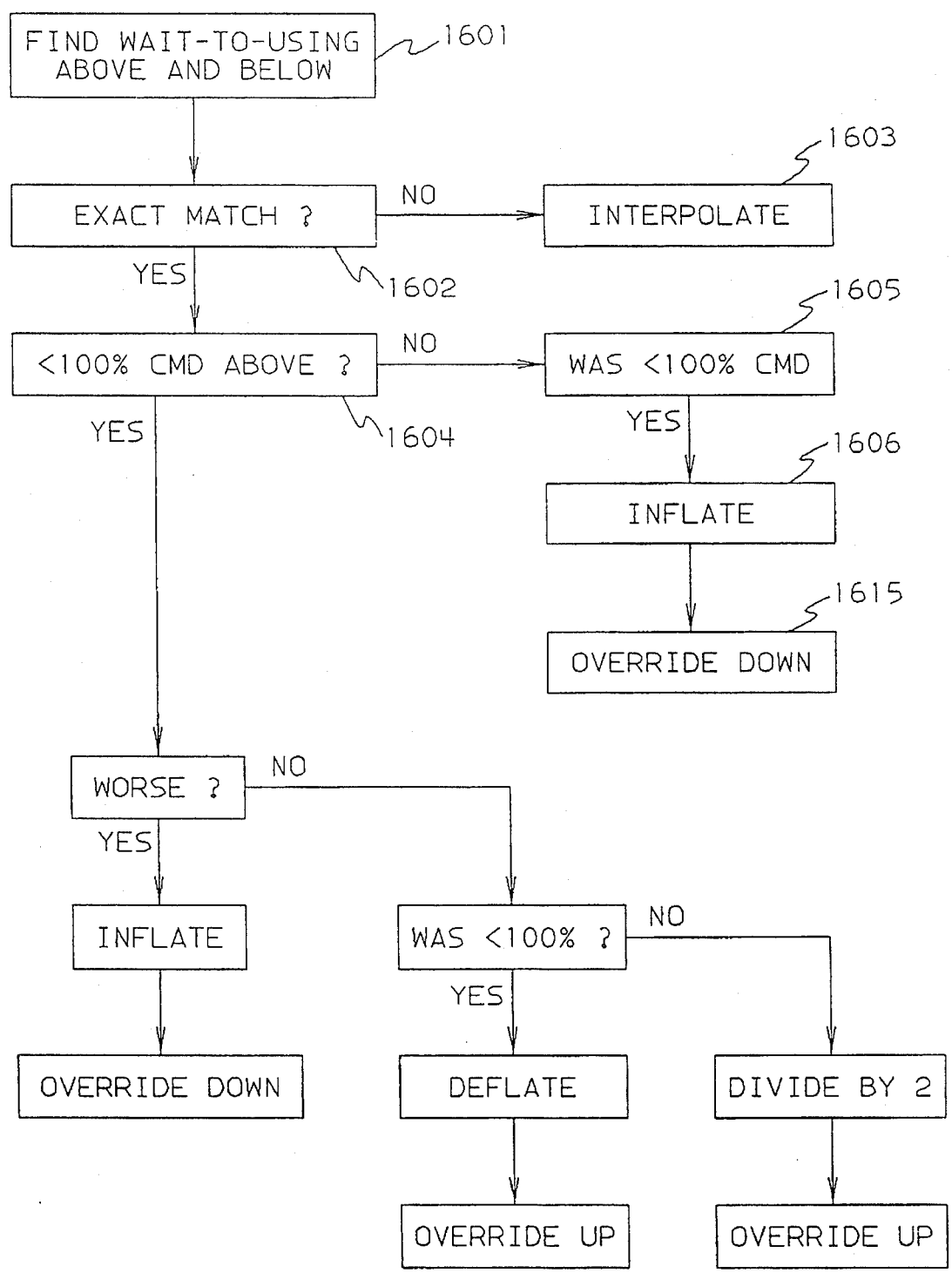
FIG. 16 is a flowchart for calculating a new wait-to-using ratio.

FIG. 16 illustrates projecting a new wait-to-using ratio (1403) using the wait-to-using table constructed as described earlier. The actual and projected wait-to-using ratios are used to calculate a new delay sample delta.

At (1601), the wait-to-using ratios at the nearest cumulative maximum above and below the projected cumulative maximum demand at the dispatching priority of interest are found in the wait-to-using table. If an exact match for the new cumulative maximum demand is not found in the table (checked at 1602), the wait-to-using ratios at the maximum demands above and below are interpolated to get the new wait-to-using ratio to use (1603). If an exact match is found, that wait-to-using ratios is adjusted.

If there is projected to be greater than 100% cumulative maximum demand above the dispatching priority of interest (1604), and there was less than 100% cumulative maximum demand (1605), the wait-to-using ratio is inflated by one-half the ratio of maximum demand that could have been consumed and the maximum demand that is projected to be consumed at the dispatching priority (1606).

If there is not projected to be greater than 100% cumulative maximum demand above the dispatching priority of interest (1604), and this cumulative maximum demand is worse than it was projected to be for the current dispatching priority (1607), the wait-to-using ratio is inflated by one-half the ratio of maximum demand that could have been consumed and the maximum demand that is projected to be consumed at the contemplated dispatching priority (1608).

If there is not projected to be greater than 100% cumulative maximum demand above the dispatching priority of interest (1604), and this is not worse than it was before (1607), and there was less than 100% cumulative maximum demand above (1610), then the wait-to-using ratio is deflated by the ratio of maximum demand that could have been consumed and maximum demand that is projected to be consumed at the priority (1611).

If there is not projected to be greater than 100% cumulative maximum demand above the dispatching priority of interest (1604), and this demand is not worse than it was for the current dispatching priority (1607), and there was not less than 100% cumulative maximum demand above (1610), the wait-to-using ratio is deflated by dividing it by 2 (1613).

In all inflation cases, if the inflated value is greater than the actual wait-to-using ratio at the next lower priority, then the wait-to-using ratio is overridden to the wait-to-using ratio at the next lower priority. If the deflated value is less than the actual wait-to-using ratio at the next higher priority, the wait-to-using ratio is overridden to the wait-to-using ratio at the next higher priority.

The wait-to-using ratio derived from the wait-to-using table is further adjusted for each individual performance goal class as follows:

$$W2U(adjusted) = W2U(\text{from table}) \times (A/B)$$

where

A = service-weighted average mean-time-to-wait at priority

B = individual performance goal class mean-time-to-wait

CPU-USING SAMPLE DELTA

Figure 17:
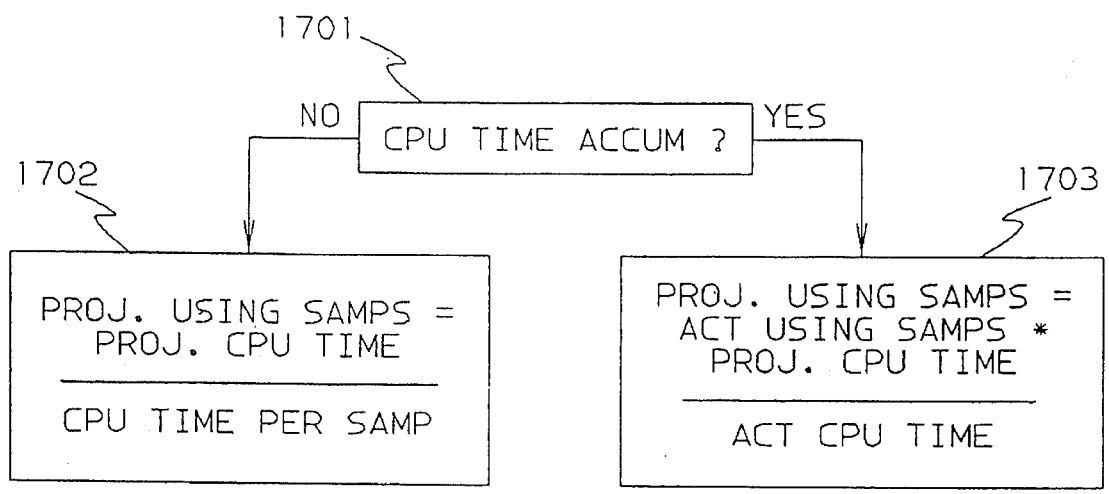
FIG. 17 is a flowchart for calculating CPU time using sample deltas.

FIG. 17 shows the logic flow for calculating CPU-using sample deltas (1404). If the CPU time was accumulated for the server class (checked at 1701), the projected using samples are set equal to the actual using samples, multiplied by the projected CPU time, divided by the actual CPU time (1703). If the CPU time was not accumulated for the server class, the projected using samples are set equal to the projected CPU time, divided by the CPU time per sample. The using sample delta is equal to the projected samples, minus the actual samples.

CPU DELAY SAMPLE DELTA

CPU delay sample deltas are calculated as follows:

$$(\text{projected delay samples}) = \frac{(\text{actual delay samples}) \times (\text{projected wait-to-using})}{(\text{actual wait-to-using})}$$

The projected delay samples are equal to the actual observed delay samples, multiplied by the projected wait-to-using ratio, divided by the actual wait-to-using ratio. The delay sample delta is equal to the projected samples, minus the actual samples.

CPU PERFORMANCE INDEX DELTA

The CPU performance index delta is calculated (1405) as follows. For client/servers, the samples are accumulated for the work units (servers). Next, the samples are apportioned to the client goal classes. Next, a new proportional aggregate speed is calculated for the client goal class. Then, the projected performance index is read from the proportional aggregate speed graph constructed for the client goal class, as described above. The CPU performance index delta is the difference between the projected performance index and the current actual performance index.

AUXILIARY STORAGE PAGING DELAY

Figure 18:
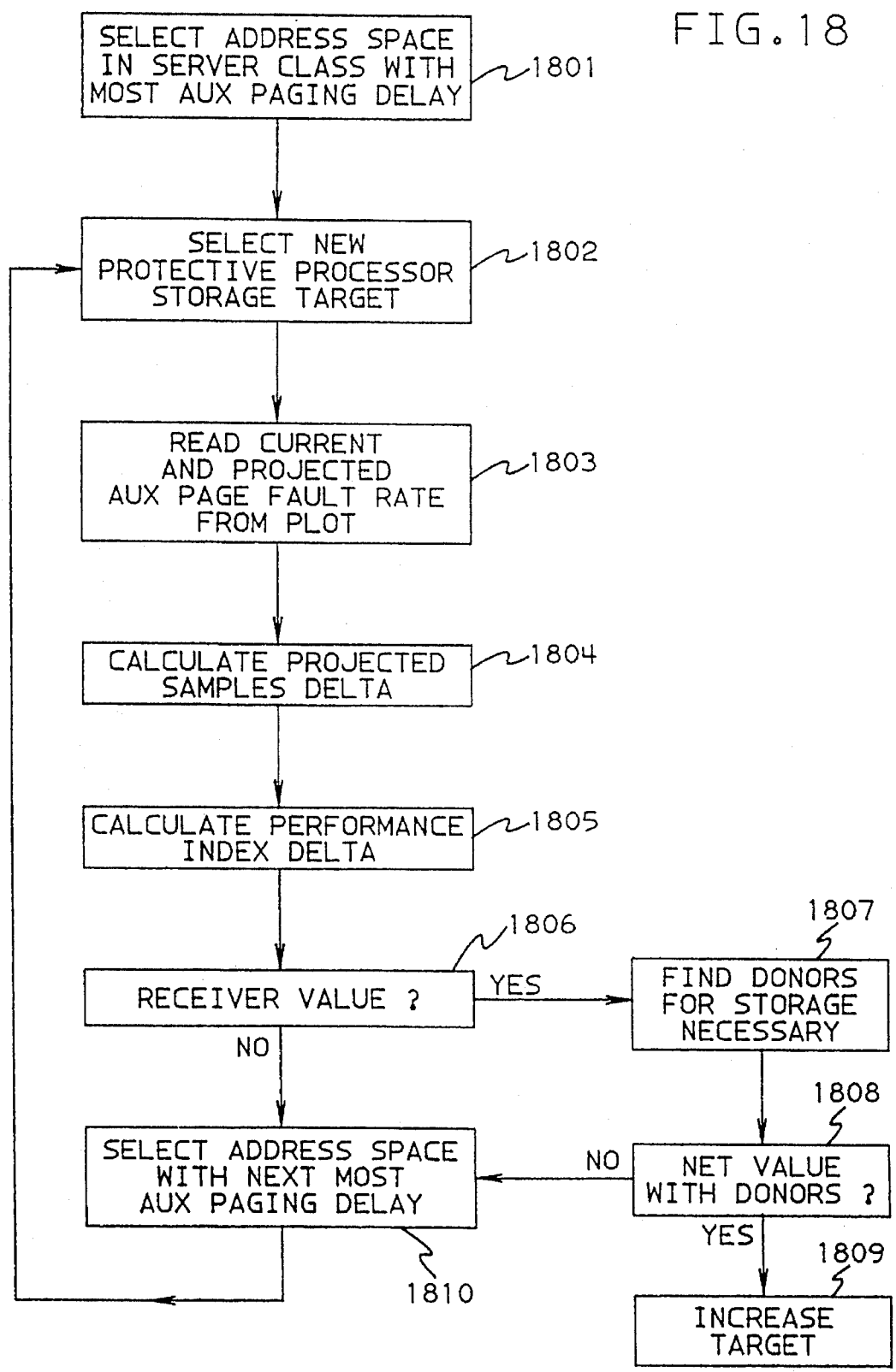
FIG. 18 is a flow chart showing logic flow to reduce auxiliary storage paging delay.

This section describes how client performance goal class performance is improved by reducing the auxiliary storage paging delay experienced by one of the servers in the server class that corresponds to the receiver client goal class. FIGS. 18–19 provide the steps involved in making the performance index delta projections provided by fix (118) to assess net value (124).

ASSESS PROCESSOR STORAGE TARGET CHANGES

FIG. 18 shows the logic flow to improve the performance of a receiver performance goal class by reducing auxiliary storage paging in the corresponding server class (131). At (1801), the server work unit is found that has the most auxiliary storage delay of all the servers in the server class. At (1802), a new protective processor storage target (133) is chosen for that server work unit. At (1803), the current auxiliary page fault rate and the projected page fault rate for the server are read from the server paging rate graph (FIG. 19). At (1804), the projected samples delta is calculated with the formula:

$$(\text{projected samples delta}) = \frac{((\text{new page fault rate}) - (\text{old page fault rate})) \times (\text{aux delay samples})}{(\text{old page fault rate})}$$

At (1805), the projected samples are apportioned back to the receiver goal class and a new proportional aggregate speed is calculated for the receiver goal class. The proportional aggregate speed graph is read to get the projected receiver goal class performance index and calculate the projected performance index delta. At (1806), a check is made for sufficient receiver value. If there is not sufficient receiver value, control passes to (1810) where the server work unit having the next most auxiliary paging delay is chosen, and then control is returned to (1802).

If there is sufficient receiver goal class value, select donor (123) is called at (1807) to find donors for the necessary storage. At (1808) a check is made to determine whether there is net value (124) in taking storage from the donors to help the receiver. If there is not net value, control is passed to (1810) to choose another server work unit to help. If there is net value, the server work unit protective paging storage target (133) is increased and the donor protective paging storage targets are decreased.

ADDRESS SPACE PAGING RATE GRAPH

FIG. 19 illustrates the work unit paging rate graph. This graph is used to assess increasing or decreasing the protective processor storage target for a work unit. The graph shows how the auxiliary page fault rate will change with the work unit size. The abscissa value is work unit size. The ordinate value is page faults per second from auxiliary storage.

EXTENSION TO OTHER RESOURCES

The methods and apparatus described in this specification provide for performance goal management. It is an important feature of the present invention that the number of bottleneck delays that can be addressed can be individually added or deleted from the scope of actions driven by the basic invention. For example, delays caused by waiting for I/O, ENQUEUEs, or initiators can be added. Only two things need be done to add a source of delay to the delays addressed: sample the delay so it is added to the picture of where units of work spend time, and provide a mechanism to assess the effects of addressing that delay.

What we claim is:

1. A Client/Server management apparatus for managing one or more servers according to client processing goals, each of said client processing goals associated with a class of said clients, each of said clients served by one or more of said servers within a data processing system, said apparatus comprising:
   a) workload manager means for creating an in storage representation of said client processing goals from an external specification of said goals;
   b) performance index calculation means for calculating a performance index for each said class of said clients;
   c) client class selection means for selecting one of said classes to be accorded improved service by analyzing said calculated performance indexes;
   d) sampler means for sampling status of said servers and storing sample data;
   e) relationship analysis means for analyzing relationships between said each said class of said clients and associated servers serving said each said class, and constructing a representation of said relationships
   f) server adjust means for adjusting service given to one or more of said servers, based on said sample data and said representation of said relationships, to effect an improvement in service to said selected one of said classes.

2. The apparatus of claim 1 in which said client class selection means further analyzes said calculated performance indexes in relation to importance values associated with each client processing goals in selecting said one of said classes.

3. The apparatus of claim 1 in which said relationship analysis means comprises server history block means, linked to each of said one or more servers, for recording instances when said each of said associated servers is observed to be serving said each said class.

4. The apparatus of claim 3 in which said relationship analysis means comprises topology builder means for constructing, from said server history block means, a stored list of served classes and each said associated server serving said served classes.

5. The apparatus of claim 4 in which said server adjust means comprises find bottleneck means for identifying a target one of said one or more servers to provide improved service to, and a target resource delay to reduce in order to provide said improved service to said target one of said one or more servers.

6. The apparatus of claim 5 in which said find bottleneck means comprises apportion delay sample means for apportioning resource delay among said one or more servers in proportion to the time each said associated server is observed serving said served class.

7. The apparatus of claim 6 in which said server adjust means further comprises fix means, responsive to said identification of said target one of said one or more servers and said identification of said target resource delay by said find bottleneck means, for reallocating processing resource to said target one of said one or more servers from a donor server.

8. The method of claim 7 in which said fix means comprises project performance index means for projecting effect of reallocating processing resource to said target one of said one or more servers from a donor server, said project performance index means using proportionate aggregate speed to project.

9. A method for managing one or more servers serving one or more clients in a data processing system, each of said one or more clients being part of a client class having a client processing goal, said method comprising the steps of:
   a) creating an in-storage representation of each said client processing goal;
   b) calculating a performance index indicative of satisfaction of said goal for each said client processing class;
   c) selecting one of said client processing classes to be accorded improved service based on said calculated performance indexes;
   d) storing sample data indicative of status of said servers;
   e) analyzing relationships between said client processing classes and associated servers serving said classes, and constructing an in-storage representation of said relationships;
   f) adjusting service given to one or more of said servers, based on said sample data and said in-storage representation, to effect an improvement in service to said selected one of said client processing classes.

10. The method of claim 9 in which said step of selecting one of said client processing classes further bases said selecting on an importance value associated with each said client processing goal.

11. The method of claim 10 in which said step of analyzing relationships comprises the step of recording instances of when each of said associated servers is observed to be serving each said client processing class, and recording said instances in a server history block associated with said associated server.

12. The method of claim 11 in which said step of analyzing relationships further comprises the step of constructing, from all server history blocks, a stored list of served classes and each said associated server serving said served classes.

13. The method of claim 12 in which said step of adjusting service comprises the step of identifying a target one of said one or more servers to provide improved service to, and a target resource delay to reduce in order to provide said improved service to said target one of said one or more servers.

14. The method of claim 13 in which said step of identifying a target one of said one or more servers comprises the step of apportioning resource delay among said one or more servers in proportion to the time each said associated server is observed serving said served class.

15. The method of claim 14 in which said step of adjusting service further comprises the step of, in response to said identifying a target server and a target resource delay, reallocating processing resource to said target one of said servers from a donor server.

16. The method of claim 15 in which said step of reallocating processing resource comprises the step of projecting effect of said reallocating by using proportionate aggregate speed to project.

* * * * *

UNITED STATES PATENT AND TRADEMARK OFFICE
CERTIFICATE OF CORRECTION

PATENT NO. : 5,537,542
DATED : Jul. 16, 1996
INVENTOR(S): Catherine K. Eilert et al.

It is certified that error appears in the above-identified patent and that said Letters Patent are hereby corrected as shown below:

Col. 2, line 42,   "FIG. 1" should be --FIG. 19--.

Signed and Sealed this

Fifth Day of November, 1996

Attest:

BRUCE LEHMAN

Attesting Officer          Commissioner of Patents and Trademarks